United States Patent
Goncalves et al.

(10) Patent No.: US 12,263,492 B2
(45) Date of Patent: Apr. 1, 2025

(54) INTERMEDIATE COOLANT GAS SEPARATION DEVICE FOR ACTIVE DEAERATION SYSTEM

(71) Applicants: Eduardo F Goncalves, Troy, MI (US); Nadine Hirceaga, Windsor (CA); Ronald A Dallison, Farmington Hills, MI (US)

(72) Inventors: Eduardo F Goncalves, Troy, MI (US); Nadine Hirceaga, Windsor (CA); Ronald A Dallison, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 907 days.

(21) Appl. No.: 17/363,072

(22) Filed: Jun. 30, 2021

(65) Prior Publication Data

US 2023/0001431 A1 Jan. 5, 2023

(51) Int. Cl.
| | | |
|---|---|---|
| *B04C 5/04* | (2006.01) | |
| *B01D 19/00* | (2006.01) | |
| *B04C 5/081* | (2006.01) | |
| *F25B 43/04* | (2006.01) | |

(52) U.S. Cl.
CPC ............ *B04C 5/04* (2013.01); *B01D 19/0057* (2013.01); *B04C 5/081* (2013.01); *F25B 43/043* (2013.01)

(58) Field of Classification Search
CPC ............ B01D 19/0057; B01D 19/0042; F25B 43/043; B04C 5/081; B04C 5/04
See application file for complete search history.

(56) References Cited

U.S. PATENT DOCUMENTS

| | | | | |
|---|---|---|---|---|
| 928,546 | A * | 7/1909 | Schneible | .......... B01D 19/0057 96/211 |
| 6,688,333 | B2 | 2/2004 | McLane et al. | |
| 8,202,356 | B2 | 6/2012 | Meinander et al. | |
| 8,683,854 | B2 | 4/2014 | Pursifull et al. | |
| 8,966,917 | B2 | 3/2015 | O'rourke et al. | |
| 2006/0086253 | A1* | 4/2006 | Gaur | ...................... B01D 47/06 96/321 |
| 2017/0361698 | A1* | 12/2017 | Hussain | .................... F01P 5/06 |
| 2019/0176057 | A1* | 6/2019 | Mendez | ............. H01M 10/625 |

FOREIGN PATENT DOCUMENTS

| | | | |
|---|---|---|---|
| DE | 102018205783 | * | 10/2018 |
| JP | S60164680 | * | 8/1985 |

* cited by examiner

*Primary Examiner* — Frantz F Jules
*Assistant Examiner* — Martha Tadesse
(74) *Attorney, Agent, or Firm* — Jeremy J. Klobucar

(57) ABSTRACT

A centrifugal coolant gas separator (CCGS) for a cooling system is provided. In one example configuration, the CCGS includes a main body defining a cyclone separator chamber therein configured to separate a flow of coolant into gas and liquid coolant, a liquid outlet formed in the main body and configured to receive the separated liquid coolant from the cyclone separator chamber, and a gas outlet formed in the main body and configured to receive the separated gas from the cyclone separator chamber. A first inlet is configured to receive a forced flow of a first portion of a coolant flow, and a second inlet is configured to receive a second portion of the coolant flow. The forced first portion of coolant flow induces the second portion of coolant flow into the cyclone separator chamber for subsequent gas and liquid coolant separation of the first and second portions of coolant flow.

20 Claims, 4 Drawing Sheets

INTERMEDIATE COOLANT GAS SEPARATION DEVICE FOR ACTIVE DEAERATION SYSTEM

FIELD

The present application relates generally to a cooling system for an internal combustion engine and, more particularly, to an active deaeration system for an internal combustion engine.

BACKGROUND

Cooling systems for vehicle engines typically include an active deaeration system to remove trapped air or vapor coolant, which can potentially lead to a reduction in cooling efficiency and in worst case scenarios potential component failure due to thermal fatigue. When designed effectively, an active deaeration system can effectively purge all gases from the system via a degas bottle, sending only liquid coolant to the heat exchangers and water pump inlet, while preserving relatively high pressure at the water pump inlet. However, at flow rates above the degas bottle flow limit, the deaeration capability can become compromised and the pressure drop between bottle and water pump inlet can potentially lead to water pump cavitation. Thus, while such conventional systems work well for their intended purpose, there remains a desire for improvement in the relevant art.

SUMMARY

According to one example aspect of the invention, a centrifugal coolant gas separator (CCGS) for a cooling system is provided. In one example configuration, the CCGS includes a main body defining a cyclone separator chamber therein configured to separate a flow of coolant into gas and liquid coolant, a liquid outlet formed in the main body and configured to receive the separated liquid coolant from the cyclone separator chamber, and a gas outlet formed in the main body and configured to receive the separated gas from the cyclone separator chamber. A first inlet is configured to receive a forced flow of a first portion of a coolant flow, and a second inlet is configured to receive a second portion of the coolant flow. The forced first portion of coolant flow induces the second portion of coolant flow into the cyclone separator chamber for subsequent gas and liquid coolant separation of the first and second portions of coolant flow.

In addition to the foregoing, the described CCGS may include one or more of the following features: wherein the main body defines a passageway configured to receive the first portion of coolant flow, a centrifugal passage configured to receive the second portion of coolant flow, and a tuned orifice disposed between the passageway and centrifugal passage, the tuned orifice configured to increase the velocity of the first portion of coolant flow as it enters the centrifugal passage, wherein the first portion of coolant flow passing through the centrifugal passage induces the second portion of coolant flow into the centrifugal passage through a Venturi effect; wherein the cyclone separator chamber converges at one end to force separated gas towards the gas outlet; and wherein the cyclone cavity separator is configured to create a high velocity vortex therein.

In addition to the foregoing, the described CCGS may include one or more of the following features: wherein the gas outlet is configured to supply gas coolant to a degas bottle; a third fluid inlet configured to receive a forced flow of a third portion of the coolant flow; wherein the first inlet port is configured to fluidly couple to a turbocharger water jacket; wherein the third inlet port is configured to fluidly couple to integrated exhaust manifold; wherein the second inlet port is configured to fluidly couple to an EGR cooler; and wherein the main body includes an upper housing coupled to a lower housing, the upper housing including the first and second inlets, the passageway, the centrifugal passage, and the gas outlet, and wherein the lower housing includes the cyclone separator chamber and the liquid outlet.

According to another example aspect of the invention, a cooling system is provided. In one example configuration, the cooling system includes a coolant circuit configured to supply coolant to a plurality of components for cooling thereof, a degas bottle disposed on the coolant circuit, and a centrifugal coolant gas separator (CCGS) configured to receive coolant from the plurality of heated components. The CCGS includes a main body defining a cyclone separator chamber therein configured to separate a flow of coolant into gas and liquid coolant, a liquid outlet formed in the main body and configured to receive the separated liquid coolant from the cyclone separator chamber, and a gas outlet formed in the main body and configured to receive the separated gas from the cyclone separator chamber. A first inlet is configured to receive a forced flow of a first portion of a coolant flow from a first component of the plurality of components, and a second inlet is configured to receive a second portion of the coolant flow from a second component of the plurality of components. The forced first portion of coolant flow induces the second portion of coolant flow into the cyclone separator chamber for subsequent gas and liquid coolant separation of the first and second portions of coolant flow, and the CCGS supplies the separated gas coolant to the degas bottle.

In addition to the foregoing, the described cooling system may include one or more of the following features: wherein the first component is one of a turbocharger and an integrated exhaust manifold; wherein the second component is an EGR cooler; wherein the main body further includes a third fluid inlet configured to receive a forced flow of a third portion of the coolant flow from a third component of the plurality of components; and wherein the third component is the other of the turbocharger and the integrated exhaust manifold.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

The present application is directed to a centrifugal coolant gas separator (CCGS) device for a cooling system having a degas bottle. The CCGS device is disposed upstream of the degas bottle and is configured to assist with coolant liquid and gas separation, for example, when the coolant system operates with a flow rate greater than what the degas bottle can handle. The CCGS receives high pressure coolant flows from the integrated exhaust manifold and turbocharger, and utilizes those high pressure flows to induce a relatively lower pressure flow from the EGR system. The CCGS then utilizes centrifugal forces to separate the gas and liquid coolant. The gas coolant is sent to the degas bottle, while the remaining (mostly) liquid coolant is sent to the water pump inlet.

Figure 1:
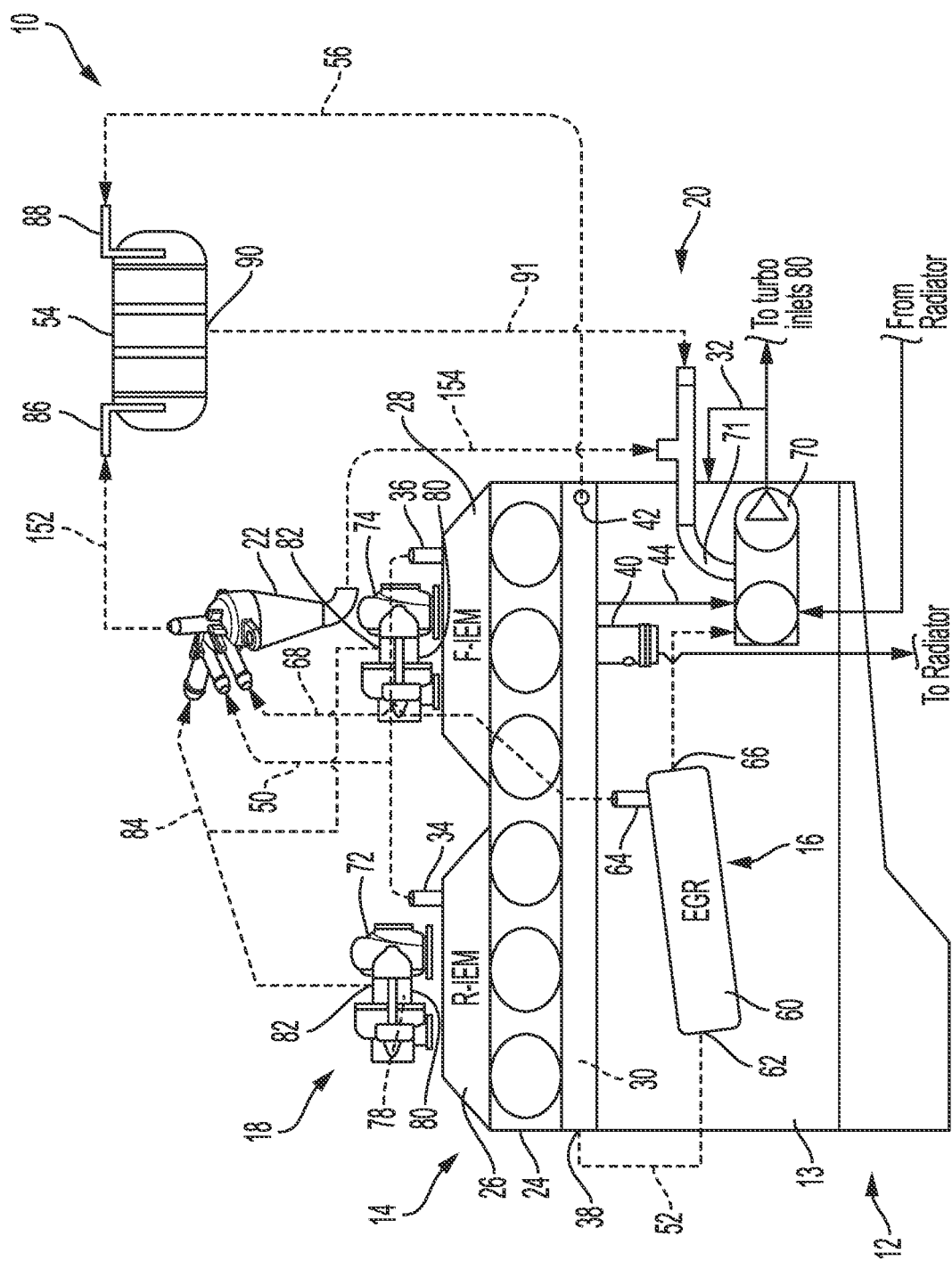
FIG. 1 is a schematic view of an example engine coolant system with active deaeration, in accordance with the principles of the present application.

With initial reference to FIG. 1, an example engine system for a vehicle is shown and generally identified by reference numeral 10. In the example embodiment, the engine system 10 generally includes an internal combustion engine 12 that includes a cylinder block 13, a cylinder head with an integrated exhaust manifold system 14, an exhaust gas recirculation (EGR) system 16, and a turbocharger system 18. An engine cooling system 20 is configured to circulate a coolant through one or more loops or circuits to cool one or more portions of the engine system 10. As described herein in more detail, the cooling system 20 includes a centrifugal coolant gas separator (CCGS) 22 configured to separate a gas and liquid coolant for recirculation in the cooling system 20 or for further separation. Although described for use with engine cooling system 20, it will be appreciated that CCGS 22 may be utilized in various other types of thermal fluid systems.

In the example embodiment, cylinder head and integrated exhaust manifold system 14 generally includes a cylinder head 24 with a first or rear integrated exhaust manifold (IEM) 26 and a second or front integrated exhaust manifold (IEM) 28. The cylinder head 24 includes an internal water jacket 30 fluidly coupled a cylinder block water jacket (not shown), a first or R-IEM outlet port 34, a second or F-IEM outlet port 36, a third outlet port 38, a fourth or engine outlet port 40, a fifth or degas outlet port 42, and a sixth or coolant bypass port 44. The cylinder head water jacket 30 receives coolant from the cylinder block water jacket for cooling exhaust gas and portions of the combustion chambers and related components (not shown). At least a portion of the liquid coolant vaporizes as it cools the surrounding components, and the resulting vapor tends to accumulate at local isolated high points of the water jacket 30, which need to be deaerated.

In the example embodiment, the R-IEM outlet port 34 is located at or near an isolated high point of the rear IEM 26, and the F-IEM outlet port 36 is located at or near an isolated high point of the front IEM 28. In this way, the first and second outlet ports 34, 36 are configured to vent coolant vapor to a vent line 50, which is fluidly coupled to the CCGS 22. The outlet port 38 is configured to supply coolant to the EGR system 16 via a conduit 52, and the engine outlet port 40 is configured to supply coolant to the engine 12. In the illustrated embodiment, the engine outlet port 40 is not located at the highest point on the engine, so to avoid a gas trap, the degas outlet port 42 is located nearby and configured to vent coolant vapor to a degas bottle 54 via a conduit 56.

With continued reference to FIG. 1, in the example implementation, the EGR system 16 includes a heat exchanger or cooler 60 with an inlet port 62, a first or vapor outlet port 64, and a second or liquid outlet port 66. The EGR cooler 60 is configured to receive coolant from the outlet port 38 via conduit 52. The supplied coolant subsequently indirectly cools exhaust gas passing through the EGR cooler 60 (e.g., via thin tubes). The large temperature gradient between the coolant and the exhaust temperature causes at least some of the coolant to vaporize. The vaporized coolant is then directed through the vapor outlet port 64 to a conduit 68, which is fluidly coupled to the CCGS 22. Liquid coolant not vaporized in the heat exchange is directed through the liquid outlet port 66 to a pump 70.

In some example implementations, the EGR cooler 60 is disposed between the engine outlet port 38 and inlet 71 of pump 70. However, the pressure drop between the outlet port 38 and the pump inlet 71 that drives EGR coolant flow is much lower than in other types of engine systems. To meet the EGR cooler coolant flow requirement, much of the pressure drop is consumed, which puts the EGR cooler vapor outlet port 64 and liquid outlet port 66 nearly at water pump inlet pressure, which is the lowest pressure in the cooling system 20. Thus, it is difficult to get coolant to flow from "near" the pump inlet pressure to anywhere else in the cooling system 20 due to the lower pressure. Accordingly, the CCGS 22 is configured to induce coolant flow through the vapor outlet port 64, as described herein in more detail.

In the example embodiment, the turbocharger system 18 includes a first turbocharger assembly 72 and a second turbocharger assembly 74, but turbocharger system 18 may include any suitable number of turbochargers (e.g., one). Each turbocharger assembly 72, 74 includes a turbocharger housing 76 having an internal water jacket 78 fluidly coupled between an inlet port 80 and an outlet port 82. The inlet ports 80 are fluidly coupled to receive coolant from a supply line 32 of pump 70, and the outlet ports 82 are fluidly coupled to the CCGS 22 via conduits 84. In the example implementation, the turbocharger assemblies 72, 74 need to be cooled at the center housing to prevent coking of the oil film on the bearing, especially immediately after engine shut down. Given the high heat load of the turbochargers, coolant is expected to boil within the center housing 76 and thus conduits 84 are treated as a vent line.

As shown in FIG. 1, the cooling system 20 includes the CCGS 22, degas bottle 54, pump 70, and a plurality of conduits. The pump 70 is configured to circulate coolant through cooling system 20 to cool various components such as the cylinder block 13, cylinder head and IEM system 14, EGR system 16, and turbocharger system 18. The degas bottle 54 is configured as a reservoir to allow for fluid expansion in the cooling system 20 and deaerates and degases the coolant letting air pockets and bubbles escape as they travel through the cooling system 20. The degas bottle 54 generally includes a first inlet 86, a second inlet 88, and an outlet 90. The first inlet 86 is fluidly coupled to the CCGS 22 to receive coolant therefrom, and the second inlet 88 is fluidly coupled to conduit 56 to receive coolant from degas outlet port 42. The outlet port 90 is configured to return liquid coolant to the pump 70 via conduit 91 for recirculation through cooling system 20. Similarly, pump 70 is configured to receive liquid coolant from the engine 12, EGR system 16, and CCGS 22 for further recirculation.

Figure 2:
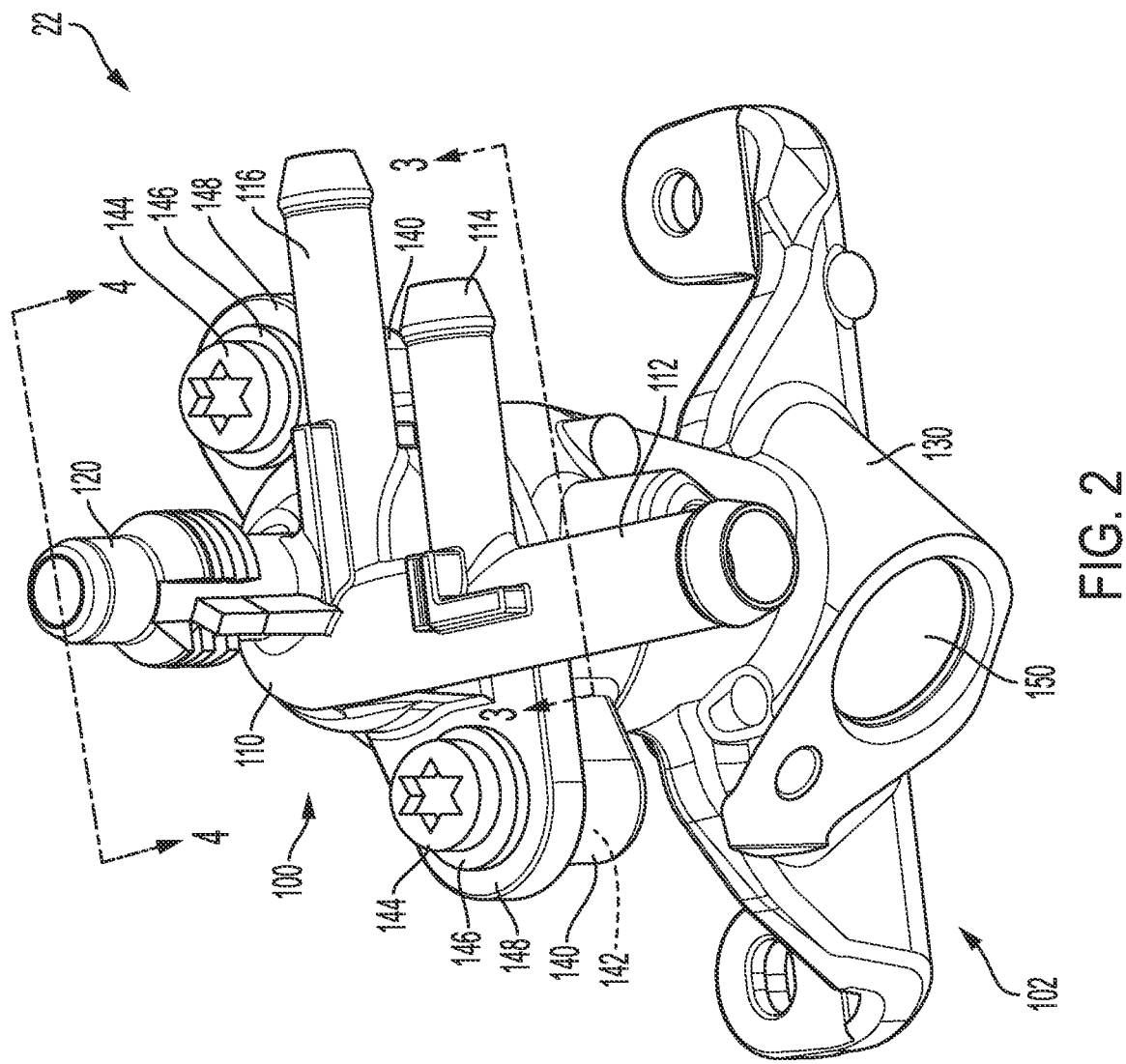
FIG. 2 is a top perspective view of an example centrifugal coolant gas separator (CCGS) device of the system shown in FIG. 1, in accordance with the principles of the present application.
Figure 3:
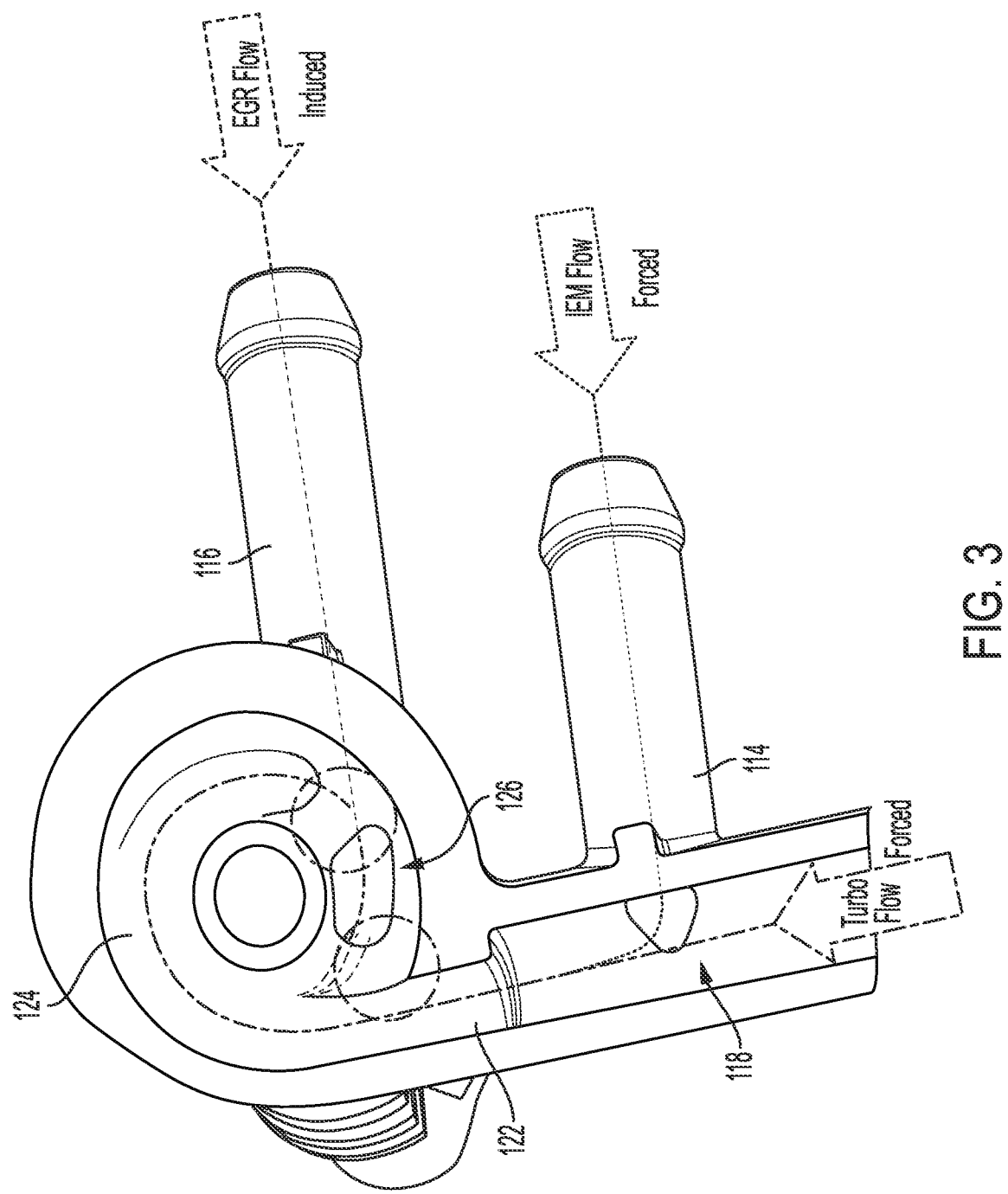
FIG. 3 is a sectional view of the CCGS device shown in FIG. 2 and taken along line 3-3, in accordance with the principles of the present application.
Figure 4:
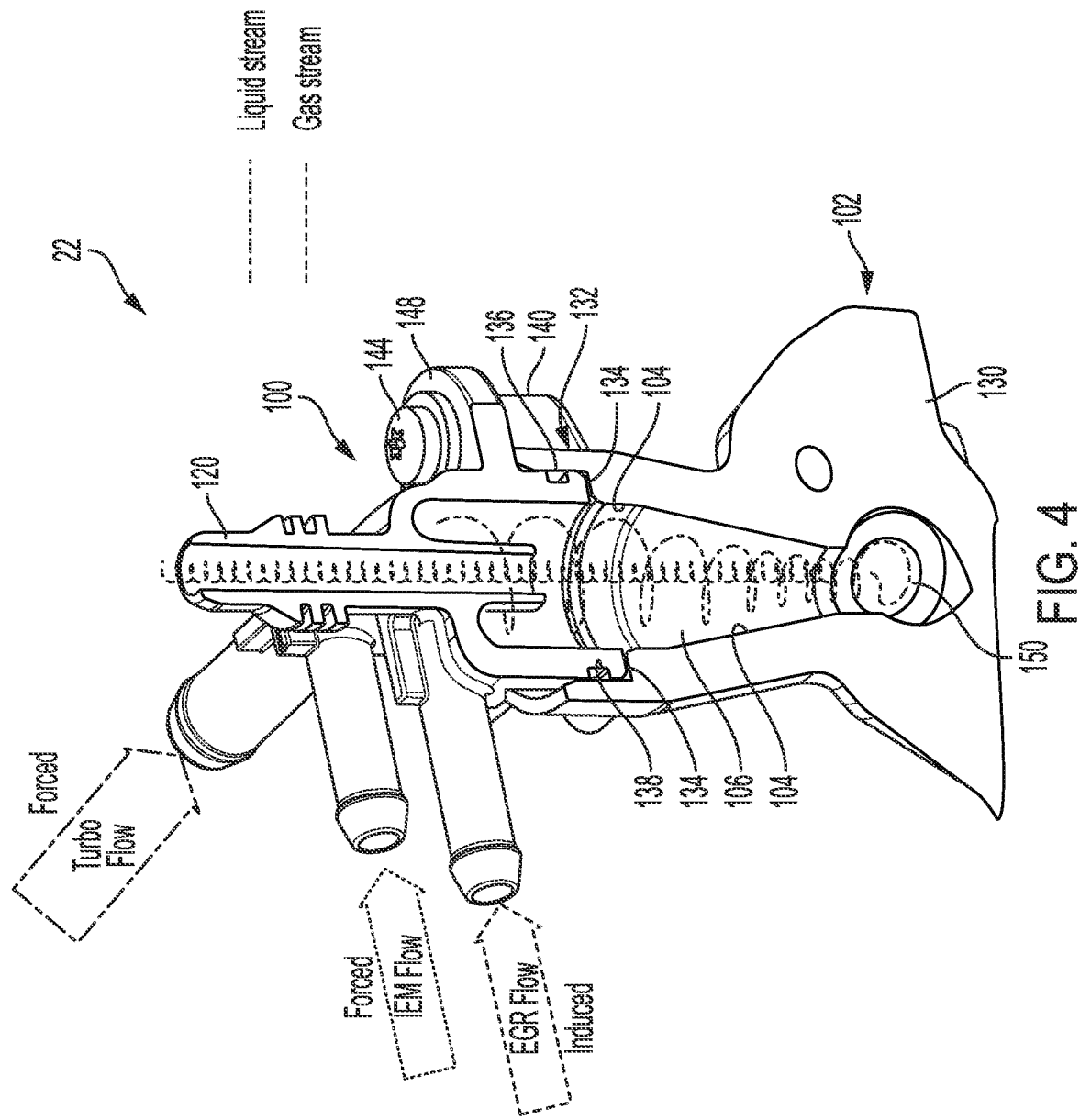
FIG. 4 is a sectional view of the coolant gas separator device shown in FIG. 2 and taken along line 4-4, in accordance with the principles of the present application.

With reference now to FIGS. 2-4, the CCGS 22 will be described in more detail. In the example embodiment, the CCGS 22 is configured to be an intermediary gas/liquid separator before a degas bottle 54 and generally includes an upper housing 100 and a lower housing 102 with inner walls 104 (FIG. 4) defining a cyclone or centrifugal separation chamber 106 (FIG. 4). The CCGS 22 receives vapor-rich coolant and is configured to create a high velocity vortex with high pressure at the inner wall 104 of the chamber 106 and low pressure at the center of the chamber 106. The pressure difference drives low density gas towards the chamber center, leaving the higher density liquid clinging to the inner walls 104. The separator chamber 106 narrows at the bottom and creates a pinch that makes it difficult for the gas to get through a lower exit, thereby forcing the separated gas upward toward an upper exit.

In the example embodiment, the upper housing 100 includes a main body 110 generally defining a first inlet port 112, a second inlet port 114, a third inlet port 116, an internal passage 118 (FIG. 3), and a gas coolant outlet port 120. The first inlet port 112 is fluidly coupled to the internal passage 118 and is configured to supply a relatively high pressure forced flow of coolant from the turbochargers 72, 74 via conduit 84. The second inlet port 114 is fluidly coupled to the internal passage 118 and is configured to supply a relatively high pressure forced flow of coolant from the IEMs 26, 28 via vent line 50. Downstream of the first and second inlet ports 112, 114, the internal passage 118 defines a tuned orifice 122 (see FIG. 3) followed by a spiral or centrifugal passage 124. The tuned orifice 122 reduces the size of internal passage 118, thereby increasing the coolant flow velocity as it enters the centrifugal passage 124.

As shown in FIG. 3, in the example embodiment, the third inlet port 116 is fluidly coupled to the centrifugal passage 124 at or near a full turn (e.g., approximately 360°) of the centrifugal passage 124. The high flow, high pressure coolant supplied by the tuned orifice 122 passes over the third inlet port 116 and creates a "cave under the waterfall" or Venturi effect, which creates a low pressure zone 126 (FIG. 3) that incudes flow from the EGR cooler 60 via conduit 68 and the third inlet port 116. As such, the tuned orifice 122 and Venturi effect induce flow of the relatively lower pressure coolant at the EGR cooler outlet 64 into the CCGS 22. In this way, coolant flows from the cylinder head and IEM system 14, the EGR system 16, and the turbocharger system 18 are directed through the centrifugal passage 124 into the chamber 106 for liquid/gas separation, as described herein in more detail.

With particular reference now to FIGS. 2 and 4, the lower housing 102 generally includes a main body 130 defining an open end 132 with a shoulder 134 to receive a lower portion of the upper housing main body 110 therein. A seal 136 (e.g., O-ring) is disposed within a channel or seat 138 formed in the lower portion of the upper housing main body 110 to establish a seal between the upper and lower housings 100, 102. A pair of projections 140 (FIG. 2) extend outwardly from the main body 130 and include an aperture 142 configured to receive a fastener 144 (e.g., bolt). The apertures 142 align with apertures 146 formed in a pair of flanges 148 extending outwardly from the upper housing main body 110. The fasteners 144 are inserted through apertures 142, 146 to couple the upper housing 100 to the lower housing 102. As shown in FIG. 2, the inner walls 104 of the lower housing 102 converge as they extend from the upper housing 100 to a liquid outlet 150 defined in the lower housing 102.

The primary function of the CCGS 22 is to receive the liquid/gas flow mixture from the inlet ports 112, 114, 116 and separate it into mostly vapor and mostly liquid. The high velocity vortex of the centrifugal separation chamber 106 drives low density vapor toward the center, and the mostly vapor flow mixture is directed through gas coolant outlet port 120 to the degas bottle 54 via a conduit 152 for final gas/liquid separation. At the same time, the high velocity vortex drives the higher density liquid to the inner walls 104 and the mostly liquid flow mixture is directed through the liquid outlet 150 to the pump 70 via conduit 154.

In one example operation, engine system 10 is cooled by liquid coolant circulated by the water pump 70 through the cooling system 20. More specifically, the liquid coolant is circulated by the water pump 70 through various conduits to a plurality of engine system components including cylinder head and IEM system 14, EGR system 16, and a turbocharger system 18. The coolant flowing through these components absorbs heat therefrom thus reducing the temperature of the component. However, during this heat exchange, liquid coolant may be heated to its boiling point, thereby converting some liquid coolant to a vapor or gas. Air or vapor trapped in the coolant can potentially lead to adverse effects on the system 10, thus it is desirable to remove the trapped gas by deaeration.

In the present example, pump 70 supplies coolant to rear and front IEMs 26, 28 for cooling thereof. The warmed coolant exits the IEMSs 26, 28 into vent line 50 and subsequently flows to the CCGS 22. Another portion of warmed coolant exits through the degas outlet port 42 into conduit 56 and subsequently flows to the degas bottle 54. Still another portion of the coolant exits through the outlet port 38 into conduit 52 and subsequently flows to the EGR cooler 60. After absorbing heat from the EGR cooler 60, vaporized coolant subsequently flows through vapor outlet port 64 and conduit 68 to the CCGS 22. Any remaining liquid coolant subsequently flows through liquid outlet port 66 and returns to pump 70. Pump 70 supplies another portion of the coolant to turbocharger assemblies 72, 74. The warmed coolant is then directed via outlet ports 82 and conduits 84 to the CCGS 22.

In the current example, CCGS inlet ports 112, 114 receive relatively higher pressure forced flows from the cylinder head and IEM system 14 and the turbocharger system 18. This forced flow is supplied through internal passageway 118 and then passes through the tuned orifice 122, which increases flow velocity. The high pressure, high velocity coolant is directed through centrifugal passage 124 and passes a fluid connection to third inlet port 116, which via a Venturi effect, induces a flow of relatively lower pressure coolant from the EGR cooler 60 through the third inlet port 116. Since coolant exiting the EGR cooler 60 is flowing at a lower pressure relative to CCGS inlet ports 112, 114, flow from the EGR cooler 60 to the CCGS 22 must be induced.

Accordingly, in the example embodiment, the flows of relatively higher pressure coolant flows into the centrifugal passage 124 and is combined with the relatively low pressure flow of coolant from EGR cooler 60 at the induced inlet 116. The combined coolant flows are then directed into the centrifugal separation chamber 106, which creates a high velocity vortex. Pressure differences in the vortex drive low density gas towards the center of the chamber 106 while higher density liquid coolant is driven by centrifugal forces toward the inner walls 104. The converging walls 104 force separated gas upward and out of the CCGS 22 through the gas-rich coolant outlet port 120 and to the degas bottle 54 for further deaeration. The separated liquid coolant flows through outlet port 150 and is returned back to pump 70 for recirculation through the cooling system.

Described herein are systems and methods for cooling system intermediate deaeration with flow induction features. The system includes a centrifugal coolant gas separator with one or more high pressure flow inlet ports and one or more low pressure flow inlet ports. A tuned orifice and centrifugal passage induce flow through the low pressure flow inlet port. The combined coolant flows then enter a centrifugal separation chamber to separate the gas and liquid coolant. Mostly gaseous coolant is directed to the center of the chamber and forced upward to an outlet and then to a degas bottle for final separation. Mostly liquid coolant is directed outward and downward in the chamber to another outlet and then to a pump for recirculation in the system. Accordingly, the centrifugal coolant gas separator advantageously provides intermediate deaeration and separation prior to the degas bottle, thereby reducing the amount of overall flow the degas bottle is required to handle. Further, the separator induces inlet flow from relatively lower pressure portion of the cooling system, thereby obviating additional delivery components (e.g., pumps) or plumbing, and avoiding flow reversal when source pressure is too low. As such, the CCGS gas and liquid outlets are tuned to ensure the degas bottle flow limit is not exceeded even when total coolant deaeration flow from all components (IEM's, turbo's, EGR cooler, and cylinder head) exceeds (e.g., doubles) the flow capacity of the degas bottle.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A centrifugal coolant gas separator for a cooling system, comprising:
    a main body defining a cyclone separator chamber therein configured to separate a flow of coolant into gas and liquid coolant;
    a liquid outlet formed in the main body and configured to receive the separated liquid coolant from the cyclone separator chamber;
    a gas outlet formed in the main body and configured to receive the separated gas from the cyclone separator chamber;
    a first inlet configured to receive a forced flow of a first portion of a coolant flow; and
    a second inlet configured to receive a second portion of the coolant flow,
    wherein the forced first portion of coolant flow induces, through a Venturi effect, the second portion of coolant flow into the cyclone separator chamber for subsequent gas and liquid coolant separation of the first and second portions of coolant flow.

2. The centrifugal coolant gas separator of claim 1, wherein the main body defines:
    a passageway configured to receive the first portion of coolant flow;
    a centrifugal passage disposed between the passageway and the cyclone separator chamber, the centrifugal passage fluidly coupled to the second inlet and configured to receive the second portion of coolant flow; and
    a tuned orifice disposed between the passageway and centrifugal passage, the tuned orifice configured to increase the velocity of the first portion of coolant flow as it enters the centrifugal passage,
    wherein the first portion of coolant flow passing through the centrifugal passage induces the second portion of coolant flow into the centrifugal passage through the Venturi effect.

3. The centrifugal coolant gas separator of claim 1, wherein the cyclone separator chamber converges at one end to force separated gas towards the gas outlet.

4. The centrifugal coolant gas separator of claim 1, wherein the cyclone separator chamber is configured to create a high velocity vortex therein.

5. The centrifugal coolant gas separator of claim 1, wherein the gas outlet is configured to supply gas coolant to a degas bottle.

6. The centrifugal coolant gas separator of claim 1, further comprising a third fluid inlet configured to receive a forced flow of a third portion of the coolant flow into the cyclone separator chamber.

7. The centrifugal coolant gas separator of claim 6, wherein the first inlet port is configured to fluidly couple to a turbocharger water jacket.

8. The centrifugal coolant gas separator of claim 7, wherein the third inlet port is configured to fluidly couple to an integrated exhaust manifold.

9. The centrifugal coolant gas separator of claim 1, wherein the second inlet port is configured to fluidly couple to an EGR cooler.

10. The centrifugal coolant gas separator of claim 1, wherein the main body includes an upper housing coupled to a lower housing, the upper housing including the first and second inlets, the passageway, the centrifugal passage, and the gas outlet, and
    wherein the lower housing includes the cyclone separator chamber and the liquid outlet.

11. A cooling system, comprising:
    a coolant circuit configured to supply coolant to a plurality of heated components for cooling thereof;
    a degas bottle disposed on the coolant circuit; and
    a centrifugal coolant gas separator (CCGS) configured to receive coolant from the plurality of heated components and comprising:
        a main body defining a cyclone separator chamber therein configured to separate a flow of coolant into gas and liquid coolant;
        a liquid outlet formed in the main body and configured to receive the separated liquid coolant from the cyclone separator chamber;
        a gas outlet formed in the main body and configured to receive the separated gas from the cyclone separator chamber;
        a first inlet configured to receive a forced flow of a first portion of a coolant flow from a first component of the plurality of heated components; and
        a second inlet configured to receive a second portion of the coolant flow from a second component of the plurality of heated components,
        wherein the forced first portion of coolant flow induces, through a Venturi effect, the second portion of coolant flow into the cyclone separator chamber for subsequent gas and liquid coolant separation of the first and second portions of coolant flow, and wherein the CCGS supplies the separated gas coolant to the degas bottle.

12. The coolant system of claim 11, wherein the main body defines:
a passageway configured to receive the first portion of coolant flow;
a centrifugal passage disposed between the passageway and the cyclone separation chamber, the centrifugal passage fluidly coupled to the second inlet and configured to receive the second portion of coolant flow; and
a tuned orifice disposed between the passageway and centrifugal passage, the tuned orifice configured to increase the velocity of the first portion of coolant flow as it enters the centrifugal passage,
wherein the first portion of coolant flow passing through the centrifugal passage induces the second portion of coolant flow into the centrifugal passage through the Venturi effect.

13. The coolant system of claim 11, wherein the first component is one of a turbocharger and an integrated exhaust manifold.

14. The coolant system of claim 13, wherein the second component is an EGR cooler.

15. The coolant system of claim 14, wherein the main body further includes a third fluid inlet configured to receive a forced flow of a third portion of the coolant flow from a third component of the plurality of heated components.

16. The coolant system of claim 15, wherein the third component is the other of the turbocharger and the integrated exhaust manifold.

17. The centrifugal coolant gas separator of claim 2, wherein the first portion of coolant flow from the tuned orifice flows through the centrifugal passage over the second inlet to create a low pressure zone to cause the Venturi effect and draw the second portion of the coolant flow into the cyclone separator chamber.

18. The centrifugal coolant gas separator of claim 2, wherein the centrifugal passage is a spiral passage.

19. The centrifugal coolant gas separator of claim 18, wherein the second inlet fluidly connects to the centrifugal passage at or near a full turn of the spiral passage after the tuned orifice.

20. A cooling system, comprising:
a coolant circuit configured to supply coolant to an exhaust manifold, an exhaust gas recirculation (EGR) cooler, and a turbocharger for cooling thereof;
a degas bottle disposed on the coolant circuit; and
a centrifugal coolant gas separator (CCGS) configured to receive coolant from the coolant circuit and comprising:
a main body defining a cyclone separator chamber therein configured to separate a flow of coolant into gas and liquid coolant;
a spiral-shaped centrifugal passage configured to supply the flow of coolant to the cyclone separator chamber;
a passageway configured to supply the flow of coolant to the centrifugal passage;
a tuned orifice disposed between the passageway and the centrifugal passage, the tuned orifice configured to increase the velocity of coolant flowing from the passageway to the centrifugal passage;
a liquid outlet formed in the main body and configured to receive the separated liquid coolant from the cyclone separator chamber;
a gas outlet formed in the main body and configured to receive the separated gas from the cyclone separator chamber;
a first inlet fluidly coupled to the passageway and configured to receive a forced flow of a first portion of a coolant flow from the exhaust manifold;
a second inlet fluidly coupled to the centrifugal passage and configured to receive a second portion of the coolant flow from the EGR cooler; and
a third inlet fluidly coupled to the passageway and configured to receive a forced flow of a third portion of the coolant flow from the turbocharger,
wherein the forced first and third portions of coolant flow induce, through a Venturi effect, the second portion of coolant flow into the cyclone separator chamber for subsequent gas and liquid coolant separation of the first, second, and third portions of coolant flow, and
wherein the CCGS supplies the separated gas coolant to the degas bottle.

* * * * *